United States Patent
Karjalainen et al.

(10) Patent No.: US 11,184,127 B2
(45) Date of Patent: Nov. 23, 2021

(54) REFERENCE SIGNAL PATTERNS

(71) Applicant: NOKIA TECHNOLOGIES OY, Espoo (FI)

(72) Inventors: Juha Pekka Karjalainen, Oulu (FI); Mihai Enescu, Espoo (FI); Jorma Johannes Kaikkonen, Oulu (FI); Sami-Jukka Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/475,453

(22) PCT Filed: Jan. 5, 2017

(86) PCT No.: PCT/EP2017/000010
§ 371 (c)(1),
(2) Date: Jul. 2, 2019

(87) PCT Pub. No.: WO2018/127265
PCT Pub. Date: Jul. 12, 2018

(65) Prior Publication Data
US 2020/0028644 A1    Jan. 23, 2020

(51) Int. Cl.
*H04W 72/04* (2009.01)
*H04L 5/00* (2006.01)
(Continued)

(52) U.S. Cl.
CPC ........ *H04L 5/0048* (2013.01); *H04L 27/2613* (2013.01); *H04W 72/042* (2013.01); *H04B 7/06* (2013.01); *H04L 5/0007* (2013.01)

(58) Field of Classification Search
CPC .. H04W 72/042; H04L 5/0007; H04L 5/0048; H04L 27/2613; H04B 7/06
See application file for complete search history.

(56) References Cited

U.S. PATENT DOCUMENTS 9,136,997 B2 * 9/2015 Gaal ................. H04L 5/0048
2013/0170435 A1 * 7/2013 Dinan ................. H04W 40/02
370/328
(Continued)

FOREIGN PATENT DOCUMENTS

EP    2 874 454 A1    5/2015

OTHER PUBLICATIONS

International Search Report and Written Opinion dated Sep. 4, 2017 corresponding to International Patent Application No. PCT/EP2017/000010.

(Continued)

*Primary Examiner* — Wei Zhao
(74) *Attorney, Agent, or Firm* — Squire Patton Boggs (US) LLP

(57) ABSTRACT

Various communication systems may benefit from improved performance. For example, communication systems may benefit from a multi-functional reference signal that allows for the harmonization of different reference signal patterns. A method, in certain embodiments, may include constructing at a base station a reference signal including a plurality of reference signal patterns. The plurality of reference signal patterns can include at least one of a default reference signal pattern or a multi-functional signal pattern for at least one of uplink or downlink. The plurality of reference signal patterns can include at least one of partially overlapping or non-overlapping resource elements. In addition, the plurality of reference signal patterns are constructed dynamically for a specific user or group of users. The method may also include sending the reference signal from the base station to a user equipment.

20 Claims, 8 Drawing Sheets

(51) Int. Cl.
  *H04L 27/26* (2006.01)
  *H04B 7/06* (2006.01)

(56) References Cited

U.S. PATENT DOCUMENTS

2014/0226636 A1   8/2014   Xu et al.
2016/0088495 A1*  3/2016   Cao ...................... H04W 16/16
                                                      370/330
2019/0372641 A1* 12/2019   Muruganathan ..... H04B 7/0617

OTHER PUBLICATIONS

ZTE, "Consideration on COMP antenna port mapping in LTE-A," 3GPP Draft; R1-083611, 3GPP TSG RAN WG1 Meeting #54bis, Prague, Czech Republic, Sep. 23, 2008, XP050316971.
Nokia et al., "On Multiplexing of Different RS Types," 3GPP Draft; R1-1711302, 3GPP TSG-RAN WG1 NR AH#2, Qingdao, P.R. China, Jun. 17, 2017, XP051305516.
Communication pursuant to Article 94(3) EPC dated Oct. 21, 2020 corresponding to European Patent Application No. 17 700 189.8.
Communication pursuant to Article 94(3) EPC issued in corresponding European Patent Application No. 17 700 189.8 dated Mar. 22, 2021.

\* cited by examiner

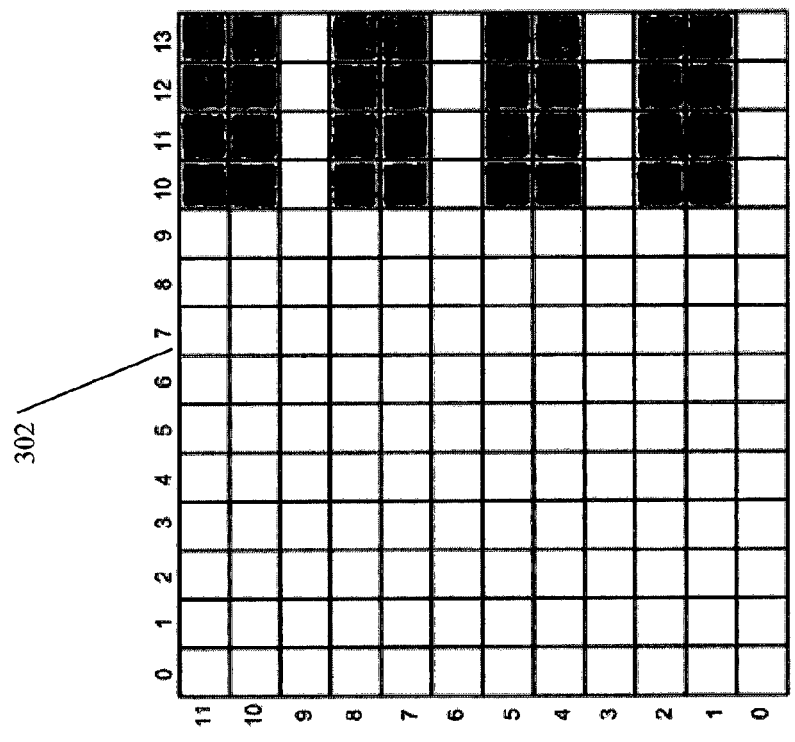
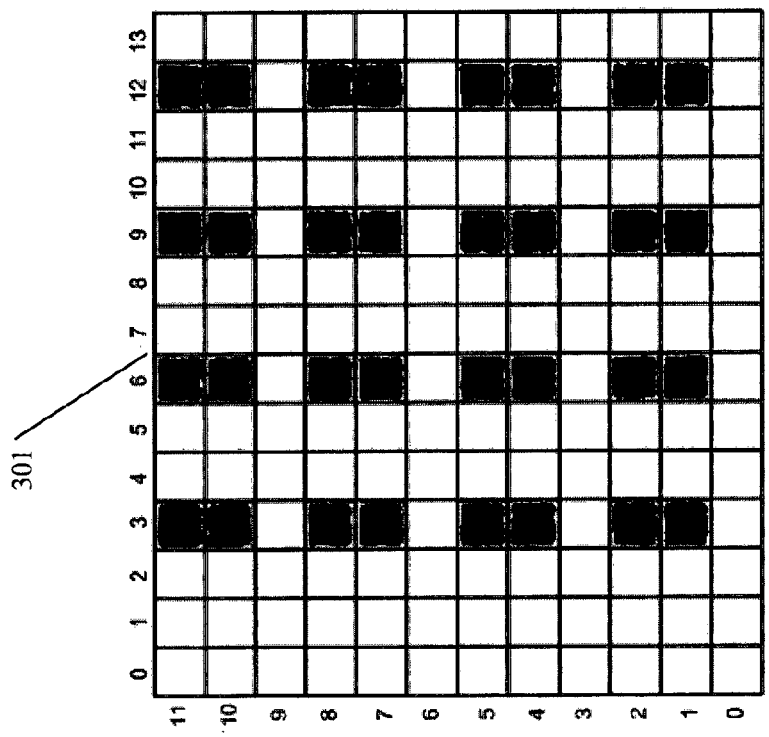
Figure 3

REFERENCE SIGNAL PATTERNS

BACKGROUND

Field

Various communication systems may benefit from improved performance. For example, communication systems may benefit from a multi-functional reference signal that allows for harmonization of a plurality of different reference signal patterns.

Description of the Related Art

To achieve sufficient coverage and capacity in a cellular network, some networks try to minimize large propagation loss of radio channels at high carrier frequencies. A resulting path loss of the radio channel is compensated for by introducing directive transmission and/or reception in the form of beamforming via large scale antenna arrays. Large scale antenna arrays lead to large antenna array gains at both a network entity and a user equipment to compensate for propagation loss, as well as losses due to other environment factors, such as rain and oxygen absorption. The gain in a base station having 64 antenna elements will be 18 decibels (dB), while the gain in a user equipment having 8 antenna elements will be 9 dB.

In order to properly exploit the full capacity of large scale antenna arrays, directivity at transmitters and receivers needs to be dynamically adjusted according to various deployment scenarios and potential changes the radio links between the transmitters and receivers. Adjusting the directivity of a large scale antenna array, however, requires a large amount of system overhead dedicated to beamforming training, beam tracking, and beam switching at a mobile device. Reducing system overhead related to beam training and tracking will involve enhancing a beam training systems to be faster and more efficient. Reference signals, and the specific design thereof, are used by the network to improve directivity and beamforming training systems.

SUMMARY

A method, in certain embodiments, may include constructing at a base station a reference signal comprising a plurality of reference signal patterns. The plurality of reference signal patterns may comprise at least one of a default reference signal pattern or a multi-functional reference signal pattern for at least one of uplink or downlink. The plurality of reference signal patterns may include at least one of partially overlapping or non-overlapping resource elements. In addition, and the plurality of reference signal patterns may be constructed dynamically for a specific user or group of users The method may also include sending the reference signal from the base station to a user equipment.

According to certain embodiments, an apparatus may include at least one memory including computer program code, and at least one processor. The at least one memory and the computer program code may be configured, with the at least one processor, to cause the apparatus at least to construct at a base station a reference signal comprising a plurality of reference signal patterns. The plurality of reference signal patterns may comprise at least one of a default reference signal pattern or a multi-functional reference signal pattern for at least one of uplink or downlink. The plurality of reference signal patterns may include at least one of partially overlapping or non-overlapping resource elements. In addition, the plurality of reference signal patterns may be constructed dynamically for a specific user or group of users. The at least one memory and the computer program code may also be configured, with the at least one processor, to cause the apparatus at least to send the reference signal from the base station to a user equipment.

An apparatus, in certain embodiments, may include means for constructing at a base station a reference signal comprising a plurality of reference signal patterns. The plurality of reference signal patterns may comprise at least one of a default reference signal pattern or a multi-functional reference signal pattern for at least one of uplink or downlink. The plurality of reference signal patterns may include at least one of partially overlapping or non-overlapping resource elements. In addition, the plurality of reference signal patterns may be constructed dynamically for a specific user or group of users. The apparatus may also include means for sending the reference signal from the base station to a user equipment.

According to certain embodiments, a non-transitory computer-readable medium encoding instructions that, when executed in hardware, perform a process. The process may include constructing at a base station a reference signal comprising a plurality of reference signal patterns. The plurality of reference signal patterns may comprise at least one of a default reference signal pattern or a multi-functional reference signal pattern for at least one of uplink or downlink. The plurality of reference signal patterns may include at least one of partially overlapping or non-overlapping resource elements. In addition, the plurality of reference signal patterns may be constructed dynamically for a specific user or group of users. The process may also include sending the reference signal from the base station to a user equipment.

According to certain embodiments, a computer program product encoding instructions for performing a process according to a method including constructing at a base station a reference signal comprising a plurality of reference signal patterns. The plurality of reference signal patterns may comprise at least one of a default reference signal pattern or a multi-functional reference signal pattern for at least one of uplink or downlink. The plurality of reference signal patterns may include at least one of partially overlapping or non-overlapping resource elements. In addition, the plurality of reference signal patterns may be constructed dynamically for a specific user or group of users. The method may also include sending the reference signal from the base station to a user equipment.

A method, in certain embodiments, may include receiving at a user equipment from a base station a reference signal comprising a plurality of reference signal patterns. The plurality of reference signal patterns may comprise at least one of a default reference signal pattern or a multi-functional reference signal pattern for at least one of uplink or downlink. The plurality of reference signal patterns may include at least one of partially overlapping or non-overlapping resource elements. In addition, the plurality of reference signal patterns may be constructed dynamically for a specific user or group of users The method may also include determining a functionality of the user equipment based on the reference signal.

According to certain embodiments, an apparatus may include at least one memory including computer program code, and at least one processor. The at least one memory and the computer program code may be configured, with the at least one processor, to cause the apparatus at least to receive at a user equipment from a base station a reference signal comprising a plurality of reference signal patterns. The plurality of reference signal patterns may comprise at least one of a default reference signal pattern or a multi-functional reference signal pattern for at least one of uplink or downlink. The plurality of reference signal patterns may include at least one of partially overlapping or non-overlapping resource elements. In addition, the plurality of reference signal patterns may be constructed dynamically for a specific user or group of users. The at least one memory and the computer program code may also be configured, with the at least one processor, at least to determine a functionality of the user equipment based on the reference signal.

An apparatus, in certain embodiments, may include means for receiving at a user equipment from a base station a reference signal comprising a plurality of reference signal patterns. The plurality of reference signal patterns may comprise at least one of a default reference signal pattern or a multi-functional reference signal pattern for at least one of uplink or downlink. The plurality of reference signal patterns may include at least one of partially overlapping or non-overlapping resource elements. In addition, plurality of reference signal patterns may be constructed dynamically for a specific user or group of users. The apparatus may also include means for determining a functionality of the user equipment based on the reference signal.

According to certain embodiments, a non-transitory computer-readable medium encoding instructions that, when executed in hardware, perform a process. The process may include receiving at a user equipment from a base station a reference signal comprising a plurality of reference signal patterns. The plurality of reference signal patterns may comprise at least one of a default reference signal pattern or a multi-functional reference signal pattern for at least one of downlink or uplink. The plurality of reference signal patterns may include at least one of partially overlapping or non-overlapping resource elements. In addition, the plurality of reference signal patterns may be constructed dynamically for a specific user or group of users. The process may also include determining a functionality of the user equipment based on the reference signal.

According to certain embodiments, a computer program product encoding instructions for performing a process according to a method including receiving at a user equipment from a base station a reference signal comprising a plurality of reference signal patterns. The plurality of reference signal patterns may comprise at least one of a default reference signal pattern or a multi-functional reference signal pattern for at least one of an uplink or downlink. The plurality of reference signal patterns may include at least one of partially overlapping or non-overlapping resource elements. In addition, the plurality of reference signal patterns may be constructed dynamically for a specific user or group of users. The method may also include determining a functionality of the user equipment based on the reference signal.

BRIEF DESCRIPTION OF THE DRAWINGS

For proper understanding of the invention, reference should be made to the accompanying drawings, wherein:

FIG. 3 illustrates a diagram of a reference signal according to certain embodiments.

DETAILED DESCRIPTION

Certain embodiments may allow for a flexible, multi-functional reference signal that can provide seamless support for dynamic time-division duplex (TDD) operations. In third generation partnership project (3GPP) 5th generation (5G) new radio (NR) technology, a multi-functional reference signal may be used instead of multiple different reference signals for NR operations. In some embodiments, therefore, a reference signal may include at least one of a default reference signal pattern and/or a multi-functional signal pattern. The reference signal described below can help to harmonize different reference signal types and patterns used in uplink and/or downlink. Default reference signal patterns may be a set of reference signal patterns associated with different RS types, while a multi-functional reference signal patterns may be user specific reference signal pattern, whether a user equipment or a group of users.

To facilitate the flexible configuration of different reference signal patterns and reference signal types, certain embodiment may be associated frequency and/or time resource elements with different NR scenarios or functionality. For example, NR functionality may include channel status information acquisition, downlink beam management, data and control demodulation, phase tracking, time and/or frequency tracking, radio link monitoring, and/or radio resource management (RRM) measurement. Utilizing a multi-functional reference signal may allow a user equipment or a network entity to utilize one or more of these functionalities, without using a large number of reference signals each providing for one specific functionality.

Figure 2:
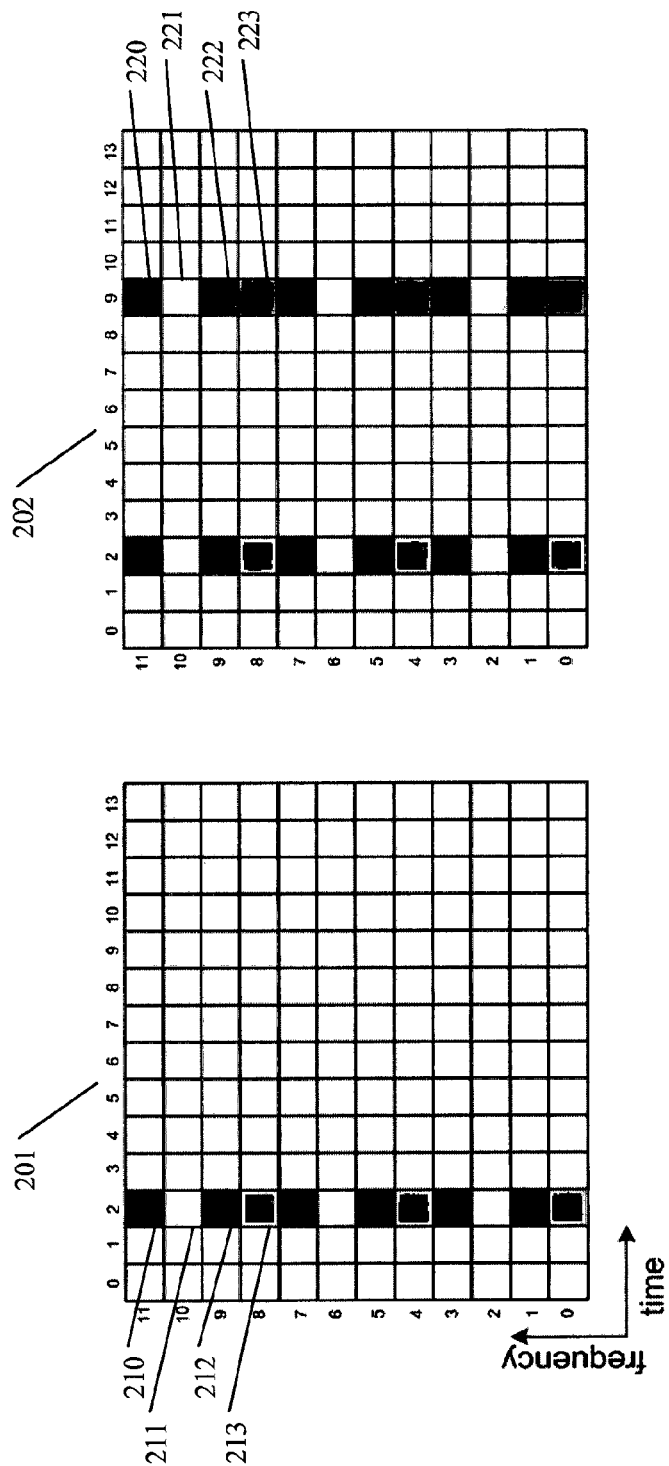
FIG. 2 illustrates a diagram of a reference signal according to certain embodiments.
Figure 4:
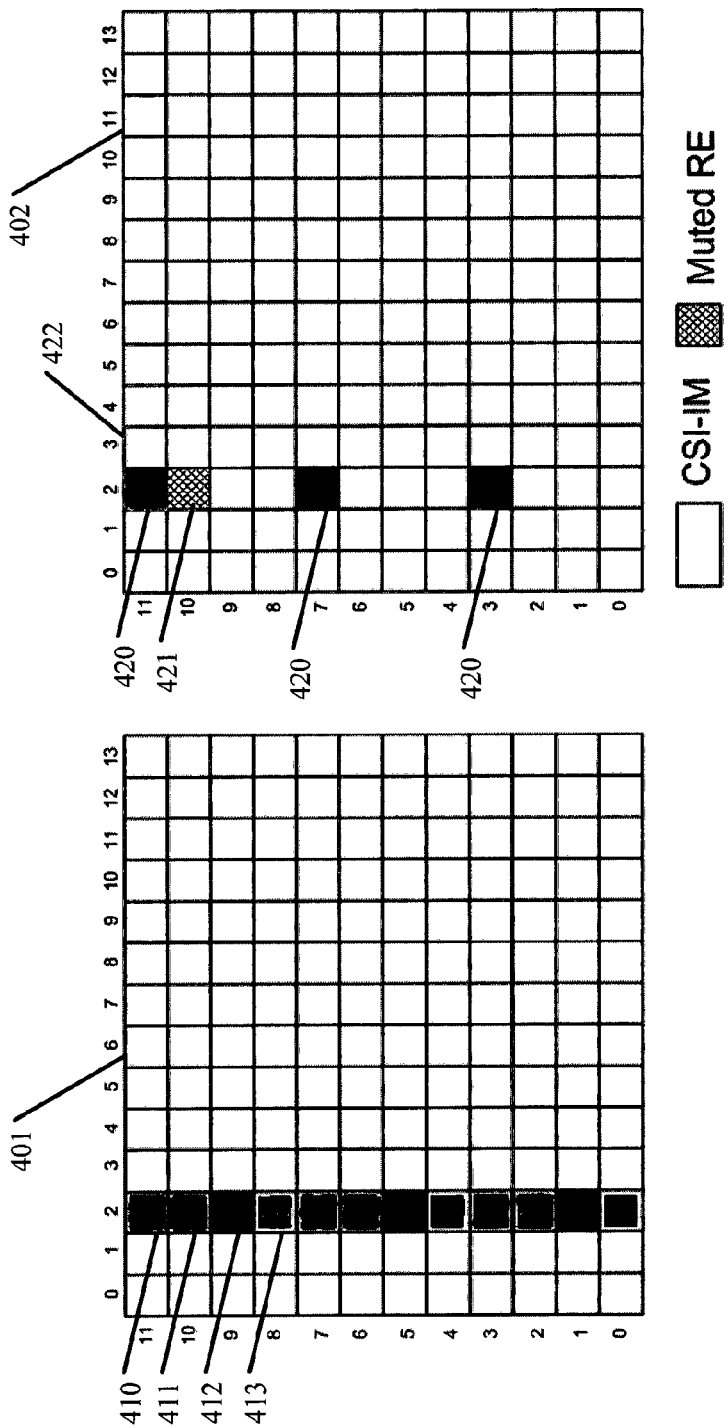
FIG. 4 illustrates a diagram of a reference signal according to certain embodiments.

In certain embodiments, different resource elements, which may be time and/or frequency resources, can be used along with different reference signal patterns to allow for different functionalities. A single reference signal, in some embodiments, may include a plurality of reference signal patterns. For example, at least one default reference signal pattern may be included in the reference signal. The default reference signal pattern may have been predetermined by a network operation, and may enable one or more functionalities. Some examples of default reference signal patterns are shown in FIGS. 2 and 3. The reference signal may also include at least one multi-functional reference signal pattern. An example of a multi-functional reference signal is shown in FIG. 4. In some embodiments, the multi-functional reference signal pattern may be determined at least in part based on the default signal functionality reference signal pattern.

Some embodiments may dynamically construct or configure a multi-functional RS pattern without a default pattern. In other words, some embodiments a plurality of reference signals may include a multi-functional RS pattern without a default pattern. The multi-functional RS pattern may be tailored and/or fine-tuned to a specific user or set of users.

The plurality of reference signal patterns may share one or more network resource elements. A network resource element, also referred to as simply a resource element, may include a time and/or frequency resources. An orthogonal frequency division multiplex (OFDM) symbol or an Orthogonal Frequency-Division Multiple Access (OFDMA) symbol, for example, may be a resource element. In some embodiments, therefore, the multi-functionality reference signal pattern may share a resource element with at least one other default reference signal pattern. This means that the multi-functionality reference signal pattern may share the same OFDM symbol as one or more other default reference signal pattern.

In some embodiments, a network entity, such as a base station, may configure or construct at least one default reference signal pattern for user equipment downlink physical resources. The at least one default reference signal pattern may be configured via radio resource control (RRC) signaling. In some other embodiments, the network entity may configure or construct a multi-functional reference signal for downlink and/or uplink transmissions. The multi-functional reference signal may be constructed using downlink control information (DCI) and/or an uplink grant for a given user equipment (UE). While in certain embodiments the network entity may construct the plurality of reference signal patterns, in some other embodiments the UE may construct or configure the multi-functional reference signal.

In yet another embodiment, a network may utilize RRC signaling to configure or construct the default reference signal pattern and/or the multi-functional reference signal pattern for user equipment downlink and/or uplink physical resources. The network may also utilize a pattern selector. The pattern selector may be a network entity used to select reference signal patterns by utilizing dynamic dedicated signaling. Default and multi-functional reference signal patterns can be coordinated between different network entities, transmission/reception points (TRP), and/or cells to limit potential interference or adapt to system load. This may allow for flexible and adaptive reference signal pattern configurations for uplink and/or downlink transmissions.

Figure 1:
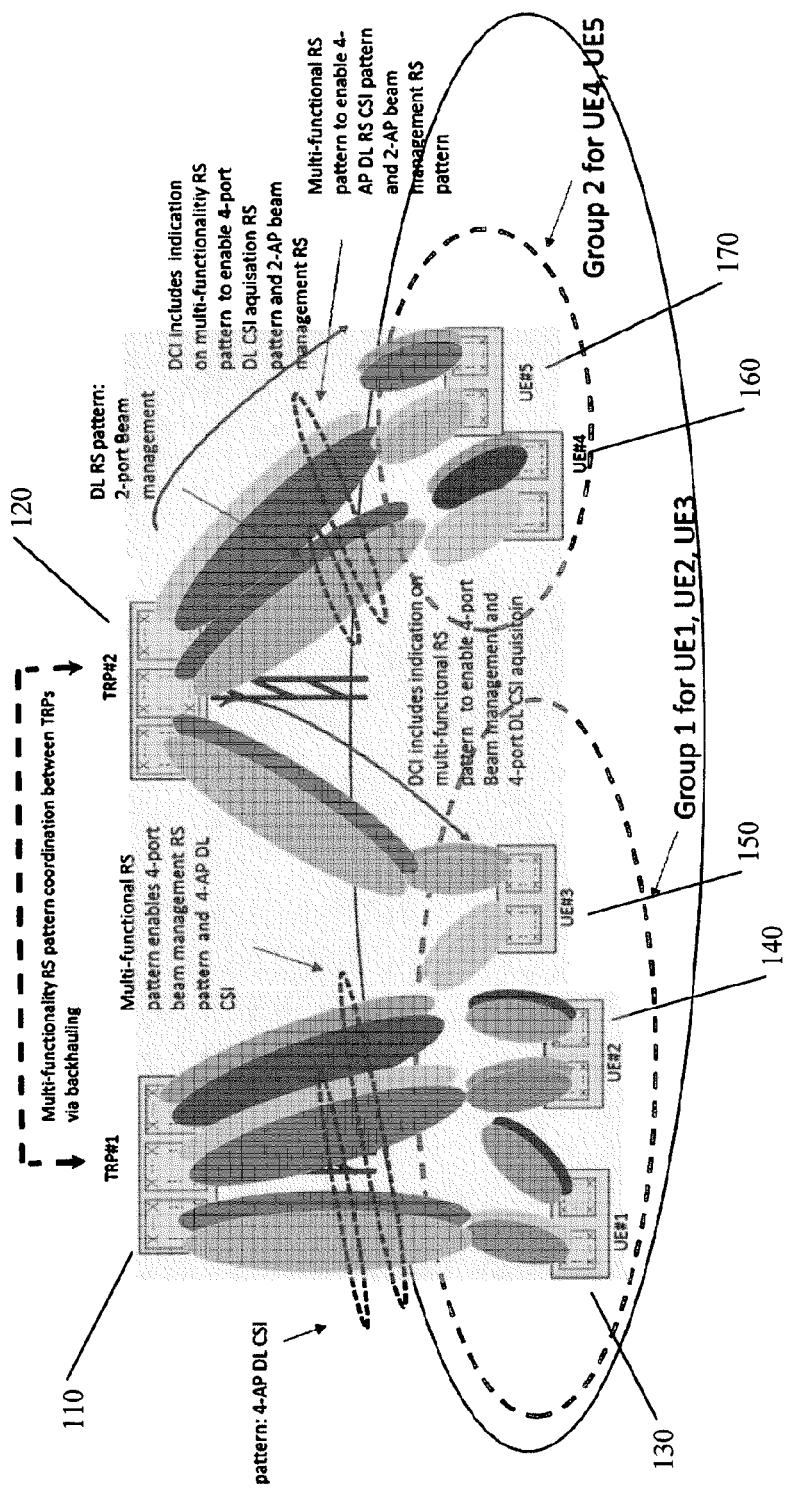
FIG. 1 illustrates a system according to certain embodiments.

FIG. 1 illustrates a system according to certain embodiments. In particular, FIG. 1 illustrates an example of the operation of a multi-functional reference signal pattern framework in a system with two TRPs 110, 120 and five UEs 130, 140, 150, 160, and 170. A TRP may be a network entity, such as a base station. In certain embodiments, a network entity may have assigned physical resources for different default RS patterns, as well as multi-functional patterns. Higher layer signaling may be used to help assign the physical resources, in certain embodiments. As can be seen in FIG. 1, a first group of UEs may include first UE 130, second UE 140, and third UE 150, and a second group of UEs may include fourth UE 140 and fifth UE 150. The first group and the second group of UEs can be said to be two different multi-functional reference signal pattern groups.

In certain embodiments, UE 150 may perform a transmission beam switch from TRP 110 to TRP 120. In other words, the UE 150 may be handed over from TRP 110 to TRP 120. The multi-functional reference signal patterns may be coordinated between TRPs via backhauling. Without utilizing multi-functional reference patterns, a network would have to add a separate reference signal resource to accommodate for UE 150 switching to TRP 120. The separate resource, for example, may be a 2-antenna port beam management (BM) reference signal pattern for UE reception beam training and/or beam status reporting from TRP 110.

By using at least one default reference signal pattern and/or at least one multi-functional reference signal pattern, however, certain embodiments can increase the number of antenna ports (APs) to which a given user equipment is assigned. Two or more antenna ports may be connected to one or more UEs. In other words, the use of a default reference signal pattern and/or a multi-functional reference pattern may allow for existing radio resources to be used more efficiently. In addition, certain embodiments may allow for increasing the number of resources for downlink BM reference signal patterns by leveraging resource and/or patterns associated with the reference signal.

For example, the reference signal shown in FIG. 1 may be a four APs downlink channel status information (CSI) reference signal pattern. The multi-functional reference signal may therefore allow for a four-port BM reference signal pattern and/or four AP downlink CSI. By sharing physical resources associated with RS patterns, two different RS types can be generated without increasing the amount of physical resources used. As a result, different RS functionalities can be enabled with same or partially same physical resources. Each reference signal may allow for at least four different APs to connect to a given network entity. In certain other embodiments, as shown in group 2 of FIG. 1, a multi-functional reference signal pattern may only allow for a four AP downlink reference signal pattern, and a two AP BM reference signal pattern.

As discussed above, using the multi-functional pattern may allow for increasing the number of APs and the utilization of resources for downlink BM reference signal patterns. In some embodiments, dedicated downlink control using, for example, DCI downlink grant may be used to indicate multi-functional reference signal patterns for UE 130, UE 140, and/or UE 150. By using the multi-functional reference signal pattern, the transmission of the four AP BM reference signal pattern can be configured simultaneously with the four AP downlink CSI acquisition reference signal pattern via a single reference signal. Similar to group 1, multi-functional reference signal patterns may also be utilized in group 2. A single reference signal may therefore allow for the use of both four AP downlink CSI acquisition for UE 170, and a two AP reference pattern for downlink BM.

The multi-functional reference signal patterns can be constructed to provide the user equipment and/or network entity with various functionalities. For example, a single reference signal, which includes the one or more multi-functional reference signal patterns, may include downlink BM. Downlink BM may include UE receiver or transmitter beam training and/or beam RRM. For example, the beam RRM may include reference signal received quality (RSRQ), reference signal received power (RSRP), and/or reference signal strength indicator (RSSI). The multi-functional reference signal patterns may also include uplink beam management, such as network entity transmitter or receiver beam training and/or beam measurements.

In some embodiments, the multi-functional reference signal pattern may include a downlink CSI acquisition. For example, the downlink CSI acquisition can include a precoding matric indicator (PMI), a rank indicator (RI), and/or a channel quality indicator (CQI). The multi-functional reference signal pattern may also include information related to the demodulation for downlink dedicated data and control, and/or demodulation for downlink common control. In other embodiments, uplink channel status information acquisition and/or demodulation for uplink dedicated data control may also be included as part of the multi-functional reference signal pattern.

FIG. 2 illustrates a diagram of a reference signal according to certain embodiments. In particular, FIG. 2 illustrates an embodiment of a demodulation reference signal (DMRS) pattern. The embodiments shown in FIG. 2 may illustrate a default reference signal pattern. In certain embodiments, Diagram 201 or 202 may be an OFDM symbol. Diagram 201 illustrates a front loaded DMRS pattern. The pattern only occupies the second time period, which may be a subframe, a symbol, or a finite amount of time. REs 210, 211, 212, and 213 each have a different frequency, and each may include different information, for example, related to the demodulation for downlink dedicated data and control or demodulation for downlink common control. The pattern of REs 210, 211, 212, and 213 may repeated in order to occupy the entire frequency of a given reference signal in the second time period.

Diagram 202, on the other hand, illustrates a high density DMRS pattern. In the high density DMRS pattern, two or more time periods are occupied. As shown in FIG. 2, the second and the ninth time periods are both occupied. The information included in the second time period may be similar to the demodulation information shown in Diagram 201. The information in time period 9, however, may be at least partially different. For example, while the information included within REs 220, 221, and 222 may be similar to the information included in 210, 211, and 212, in some embodiments the information included in RE 223 may defers from that of RE 213.

FIG. 3 illustrates a diagram of a reference signal according to certain embodiments. In particular, FIG. 3 illustrates an embodiment of a CSI reference signal pattern. The embodiments shown in FIG. 3 may also be default reference signal patterns. Diagram 301 may be a uniform distribution 32 port CSI reference signal pattern. In other words, only 32 REs are occupied, and the spots are equally distributed. For example, the occupied REs including CSI are distributed in the third, sixth, ninth, and twelve time periods, meaning that the REs have two unoccupied time periods between each other. In addition, the CSI reference signal pattern only occupies the first, second, fourth, fifth, seventh, eight, tenth, and eleventh frequency REs, while the third, sixth, and ninth REs remain unoccupied.

Diagram 302, on the other hand, illustrates a back loaded 32 port CSI reference signal. As can be seen in FIG. 3, all of the occupied time REs are located in the tenth, eleventh, twelve, and thirteenth time REs. The frequency REs are occupied in a similar manner to the pattern of diagram 301.

FIG. 4 illustrates a diagram of a reference signal according to certain embodiments. In particular, FIG. 4 illustrates a multiplexing CSI reference signal and DMRS located within the same OFDM symbol. The embodiments shown in FIG. 4 may therefore be a multi-functional reference signal pattern, in which a CSI reference signal and DMRS are multiplexed within a given resource element. In other embodiments, any other type of reference signals may be multiplexed. As can be seen in the default reference signal patterns of FIGS. 2 and 3, no multiplexing is utilized. In other words, the OFDM symbol of a default reference signal pattern may include the same type of reference signal, while a multi-functional reference signal pattern may include two or more different types of reference signal patterns including same or different numerologies. Numerologies, for example, may be CSI or DMRS. In the multi-functional reference pattern shown in FIGS. 4, DMRS and CSI reference signal patterns can share the same resource element. For example, the DMRS and the CSI reference signal patterns can be located within the same OFDM symbol.

For example, the tenth resource 410 and eleventh resource 411 in FIG. 4 may be allocated to CSI reference signal, while the ninth resource 412 and eighth resource 413 may be allocated to DMRS. As such, any resource element may be a possible placement for any type of reference signal. In certain embodiments, diagram 401 illustrates a multi-function pattern that may be at least partially derived based on at least one default reference signal pattern. The multi-function reference signal pattern and the default reference signal pattern may share at least one resource element. In other words, the plurality of reference signal patterns may include at least one of partially overlapping or non-overlapping resource elements.

Certain embodiments may use pre-configured common physical resources for downlink and/or uplink of multi-functional reference signal patterns received via RRC signaling for some or all UEs for reference signal sharing for downlink and/or uplink. In some other embodiments, DCI may be used by the UE and/or an uplink grant provided in a dedicated downlink control channel. In certain embodiments, a network entity, such as a base station, may signal a UE or a group of UEs, an indication of how to construct a multi-functional reference pattern based on default reference signal patterns. The UE may use the multi-functional reference pattern to derive the locations of the REs associated with the RS pattern. The UE may then use the derived REs to perform, for example, channel estimation-based assigned RS. Additionally, the UE may utilize information relating to the structure of the RS to fine-tune the estimator parameterization of the UE, such as channel estimator parametrization.

The multi-functional reference signal pattern in frequency and/or time can be defined per AP, per group of APs, per physical resource block (PRB), and/or per set of PRBs. The set of PRBs may include consecutive or non-consecutive PRBs. The multi-functional reference pattern may define resource elements that are allocated for UE or group of UEs for downlink reception and/or uplink transmission. The resource elements may either be part of the same or different reference signal pattern configured for same and/or different UEs.

In certain embodiments, multi-functional reference signals patterns can be determined to be periodic or non-periodic in frequency. For example, every second frequency RE may be available for reception or transmission. In other embodiments, resource elements may be offset. Offsetting the resource elements may include defining a resource element starting index for multi-functional reference signal patterns in a PRB. For example, by using an offset equal to two for a first AP, the RS pattern associated with the first AP may start from a third RE. In other embodiments, the offsetting RE may be zero or more.

The reference signals may also include a pattern in time, where the reference signals occupy every k number of symbols in time. In certain embodiments, the time of the reference signal patterns may be regular or irregularity. There may also be repetition in time symbols, in which two consecutive time symbols are occupied. In some other embodiments, the pattern may have a symbol time offset that defines resource elements starting index for a multi-functional reference signal pattern in time.

As discussed above, FIG. 4 illustrates a reference signal in which a multi-functional reference signal pattern and a default reference signal pattern are included. Diagram 402 depicts multiplexing DMRS, zero power CSI reference signals, and data reference signals under a CSI interference measurement (CSI-IM) resource. As can be seen in Diagram 402, CSI-IM 422, DMRS 420, and muted resource elements 421, which may be zero power CSI reference signal, may overlap. CSI-IM 422 may include four symbols ranging from the second and third time REs and the tenth and eleventh frequency REs. As shown in Diagram 402, however, DMRS 420 and CSI-IM 422 can overlap so that effective channel of the interference may be estimated directly inside the CSI-IM.

Figure 5:
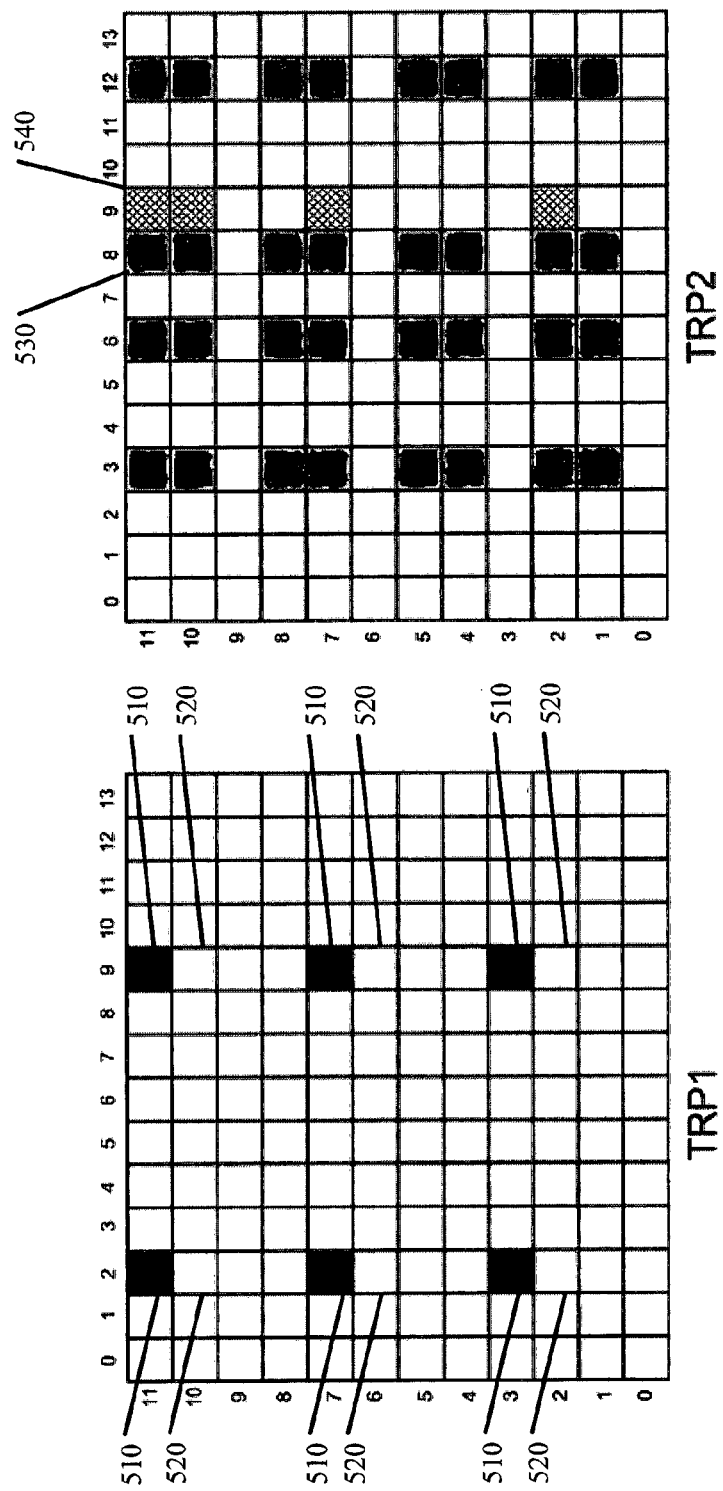
FIG. 5 illustrates a diagram of a reference signal according to certain embodiments.

FIG. 5 illustrates a diagram of a reference signal according to certain embodiments. In particular, FIG. 5 illustrates a setup for a multi-point transmission that may include two or more network entities. The pattern shown in TRP1 depicts the transmission from TRP1 of DMRS 510, 520 to a first UE. TRP2, on the other hand, illustrates transmissions from TRP2 of CSI reference signals to a second UE. While FIG. 5 illustrates default reference signal patterns, other embodiments may include multi-functional reference signal patterns.

As can be seen in FIG. 5, TRP2 is muting resources elements that are used for the first UE in TRP2. In certain embodiments, because muting may involve not transmitting scheduled CSI reference signals, TRP2 may switch or shift the CSI reference signal pattern to another available time RE or time RE. For example, the resources in the ninth time RE 540 may be shifted to the eighth time RE 530. This allows for dynamically modifying reference signal patterns that allow for multi-functioning reference signals to be transmitted and/or received.

Figure 6:
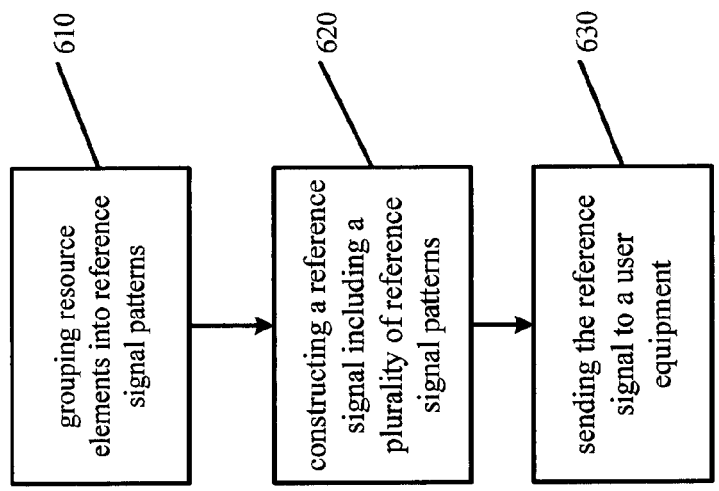
FIG. 6 illustrates a flow diagram according to certain embodiments.

FIG. 6 illustrates a flow diagram according to certain embodiments. In particular, FIG. 6 illustrates an embodiment of a network entity, such as a base station. In step 610, the network entity may group the resource elements into a plurality of reference signal patterns. The plurality of reference signal patterns may include at least one of partially overlapping or non-overlapping resource elements. For example, the reference signal patterns may be included within a single OFDM symbol. The plurality of reference signal patterns may be constructed dynamically for a specific user or group of users. The resource elements may be grouped of two or more different reference signal patterns of the plurality of reference signal patterns to ensure that the resource elements do not overlap or at least partially overlap.

In step 620, the network entity may construct a reference signal including a plurality of reference signal patterns. The reference signal patterns may include at least one of a default reference signal pattern or a multi-functional signal pattern for at least one of uplink or downlink. In certain embodiments, the network entity may coordinate the plurality of radio signal patterns between at least one of one or more cells or one or more TRPs. The plurality of radio signal patterns may be coordinated so as to mute at least a part of the resource elements to prevent interference of the radio signal patterns between the TRPs. The network entity, in some embodiments, may also construct dynamically a selection pattern between the plurality of reference signal patterns. The UE may use such selection pattern to select an appropriate reference signal pattern.

In step 630, the reference signal may be sent from the base station to the UE. The UE may then use the reference signal, and the plurality of radio signal patterns included therein, to determine a functionality of the user equipment based on the reference signal.

Figure 7:
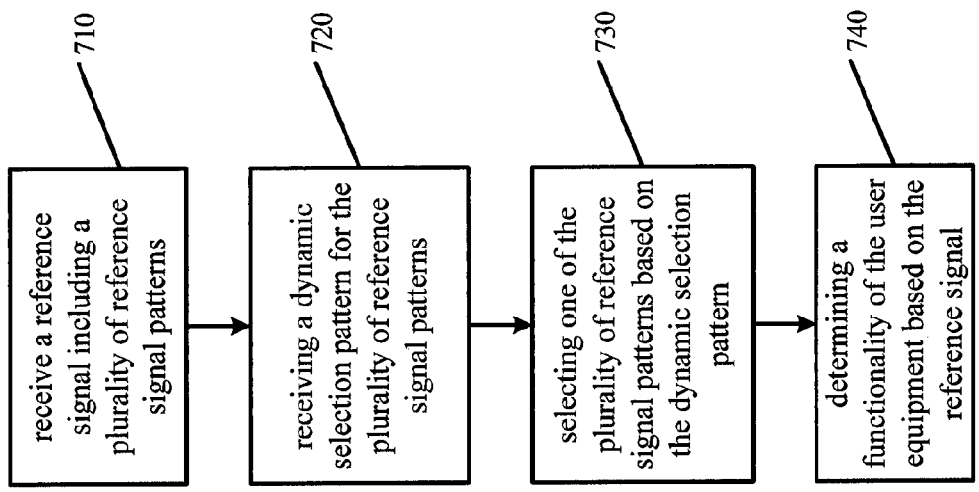
FIG. 7 illustrates a flow diagram according to certain embodiments.

FIG. 7 illustrates a flow diagram according to certain embodiments. In particular FIG. 7 illustrates an embodiment of a user equipment. In step 710, the user equipment may receive from a base station a reference signal comprising a plurality of reference signal patterns. The plurality of reference signal patterns may comprise at least one of a default reference signal pattern or a multi-functional signal pattern at lease for one of uplink or downlink. The plurality of reference signal patterns may include at least one of partially overlapping or non-overlapping resource elements. In certain embodiments, the UE may also receive a dynamic selection pattern for the plurality of reference signal patterns, as shown in step 720. The plurality of reference signal patterns may be constructed dynamically for a specific user or group of users. The dynamic selection pattern may be used to select one of the plurality of reference signal patterns based on the dynamic selection pattern, as shown in step 730.

In step 740, the user equipment may determine a functionality of the user equipment based on the reference signal. The functionality, for example, may include functionality at least one of downlink beam management, uplink beam management, cell specific identification acquisition, demodulation for downlink dedicated data and control, demodulation for downlink common control, uplink cell specific identification acquisition, and/or demodulation for uplink dedicated data and control. The handover of the user equipment may be initiated to another base station. Upon being moved to another base station, the multi-functional reference signal pattern may be used to determine UE functionality without adding the separate radio signal resource.

Figure 8:
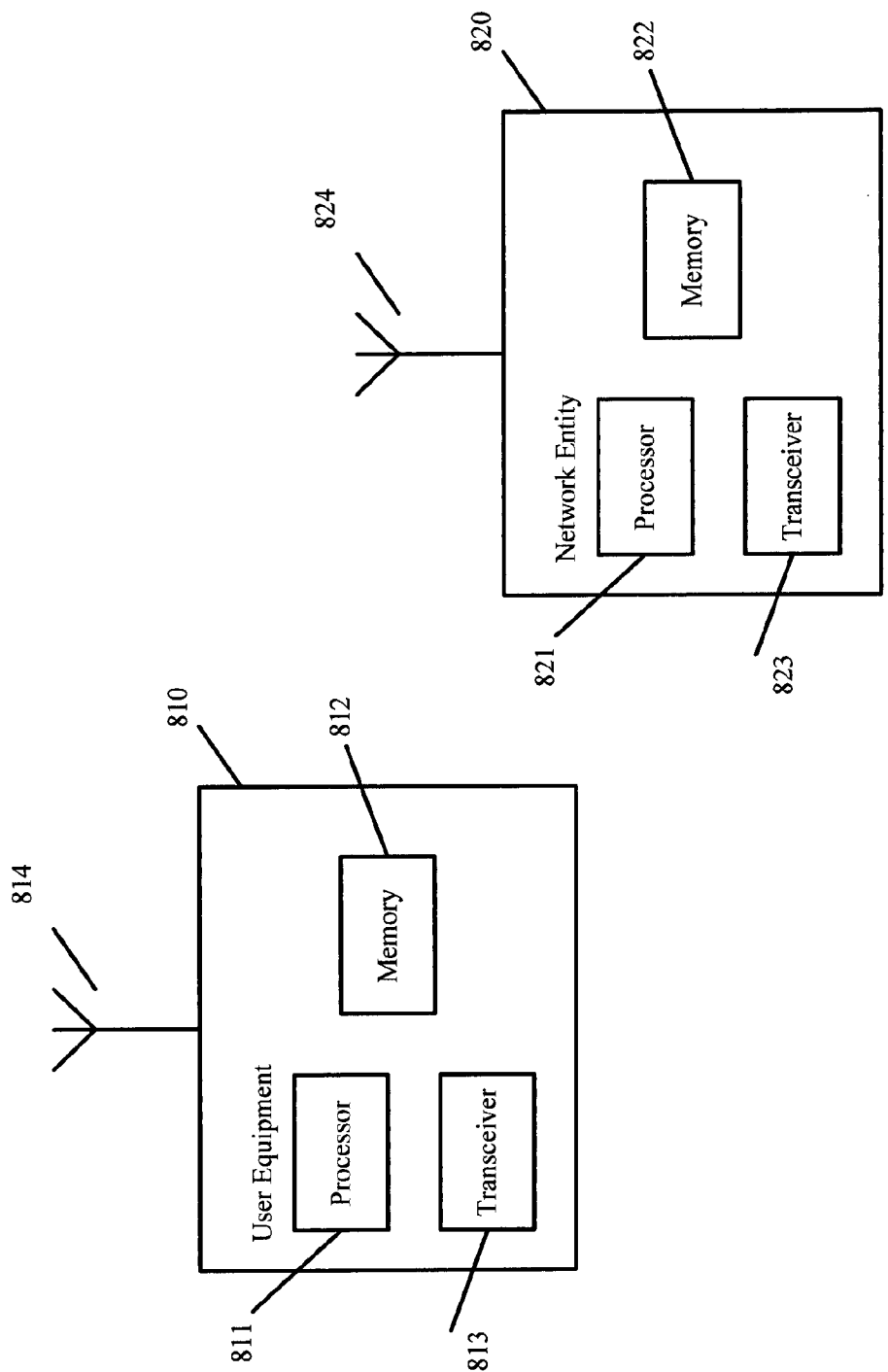
FIG. 8 illustrates a system according to certain embodiments.

FIG. 8 illustrates a system according to certain embodiments. It should be understood that each signal or block in FIGS. 1-7 may be implemented by various means or their combinations, such as hardware, software, firmware, one or more processors and/or circuitry. In one embodiment, a system may include several devices, such as, for example, network entity 820 or UE 810. The system may include more than one UE 810 and more than one network entity 820, although only one access node shown for the purposes of illustration. The network entity may be a base station, network node, an access node, a 5G NB or 5G BTS, a TRP, a server, a host, or any of the other access or network nodes discussed herein.

Each of these devices may include at least one processor or control unit or module, respectively indicated as 811 and 821. At least one memory may be provided in each device, and indicated as 812 and 822, respectively. The memory may include computer program instructions or computer code contained therein. One or more transceiver 813 and 823 may be provided, and each device may also include an antenna, respectively illustrated as 814 and 824. Although only one antenna each is shown, many antennas and multiple antenna elements may be provided to each of the devices. Other configurations of these devices, for example, may be provided. For example, network entity 820 and UE 810 may be additionally configured for wired communication, in addition to wireless communication, and in such a case antennas 814 and 824 may illustrate any form of communication hardware, without being limited to merely an antenna.

Transceivers 813 and 823 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 810 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a network entity, may include means for carrying out embodiments described above in relation to FIGS. 1-7. In certain embodiments, at least one memory including computer program code can be configured to, with the at least one processor, cause the apparatus at least to perform any of the processes described herein.

Processors 811 and 821 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 820 or UE 810, to perform any of the processes described above (see, for example, FIGS. 1-7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 8 illustrates a system including a network entity 820 and UE 810, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and a network entity, such as a relay node. The UE 810 may likewise be provided with a variety of configurations for communication other than communication network entity 820. For example, the UE 810 may be configured for device-to-device or machine-to-machine communication.

The above embodiments provide for improvements to the functioning of a network and/or to the functioning of the network entities within the network, or the user equipment communicating with the network. Specifically, certain embodiments allow for different reference signals patterns with different functionalities that can be flexibly and adaptively configured for a user equipment and/or group of UEs simultaneously in uplink and/or downlink. As discussed above, by using multi-functional reference signal patterns, transmission efficiency and radio resource utilization can be enhanced. In addition, overhead related to support of different radio signal pattern may be minimized, therefore removing the number of resources in the network dedicated for different radio signals.

In certain embodiments, allowing for multiplexing of different reference signal patterns within a shared resource element, such as in the same symbol or set of OFDM symbols, may minimize or decrease process latency associated with different reference signals. Further, the above embodiments can also allow for the efficient leveraging of advances receivers at the user equipment.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to a 5G environment, other embodiments can be directed to other 3GPP technology, such as Long Term Evolution (LTE), LTE Advanced, 4th generation (4G), or Internet of Things technology.

| Partial Glossary | |
|---|---|
| 3GPP | 3rd Generation Partnership Project |
| 5G | 5th generation |
| RSRP | reference signal received power |
| RS | reference signals |
| RRM | radio resource management |
| OFDM | orthogonal frequency division multiplex |
| RRC | radio resource control |
| TRP | transmission/reception points |
| BM | beam management |
| AP | antenna port |
| CSI | channel status information |
| CSI-IM | CSI interference measurement |
| RSRQ | reference signal received quality |
| RSSI | reference signal strength indicator |
| PRB | physical resource block |
| PMI | precoding matric indicator |
| RI | rank indicator |
| CQI | channel quality indicator |
| DMRS | demodulation reference signal |
| UE | user equipment |

We claim:

1. A method, comprising:
constructing, at a base station, a reference signal comprising a plurality of reference signal patterns, wherein the plurality of reference signal patterns comprise a multi-functional reference signal pattern for at least one of uplink or downlink, wherein the plurality of reference signal patterns comprise at least one of partially overlapping or non-overlapping resource elements, and wherein the plurality of reference signal patterns are constructed dynamically for a specific user or group of users; and
sending the reference signal from the base station to a user equipment.

2. The method according to claim 1, further comprising:
grouping the resource elements of two or more different reference signal patterns of the plurality of reference signal patterns to ensure that the resource elements do not overlap or at least partially overlap.

3. The method according to claim 1, wherein the plurality of reference signal patterns comprise two or more different types of reference signal patterns comprising same or different numerologies.

4. The method according to claim 1, further comprising:
constructing dynamically a selection pattern between the plurality of reference signal patterns;
constructing the multi-functional reference signal pattern via radio resource control signaling; and
constructing the multi-functional reference signal pattern via at least one of downlink control information or an uplink grant.

5. The method according to claim 1, further comprising:
coordinating the plurality of reference signal patterns between at least one of one or more cells or one or more transmission reception points.

6. The method according to claim 1, wherein the multi-functional reference signal pattern allows the user equipment to be handed over to another base station without adding a separate reference signal resource.

7. The method according to claim 1, wherein the multi-functional reference signal pattern comprises at least one of downlink beam management, uplink beam management, cell status information acquisition, demodulation for downlink dedicated data and control, demodulation for downlink common control, uplink channel status information acquisition, or demodulation for uplink dedicated data and control.

8. The method according to claim 1, further comprising:
determining the multi-functional reference signal pattern per antenna port, physical resource block, or a set of physical resource block.

9. A method, comprising:
receiving, at a user equipment from a base station, a reference signal comprising a plurality of reference signal patterns, wherein the plurality of reference signal patterns comprise a multi-functional reference signal pattern for at least one of uplink or downlink, wherein the plurality of reference signal patterns comprise at least one of partially overlapping or non-overlapping resource elements, and wherein the plurality of reference signal patterns are constructed dynamically for a specific user or group of users; and
determining a functionality of the user equipment based on the reference signal.

10. The method according to claim 9, wherein the plurality of reference signal patterns comprise two or more different types of reference signal patterns comprising same or different numerologies.

11. The method according to claim 9, comprising:
receiving a dynamic selection pattern for the plurality of reference signal patterns; and
selecting one of the plurality of reference signal patterns based on the dynamic selection pattern.

12. The method according to claim 9, wherein the resource elements of two or more different reference signal patterns of the plurality of reference signal patterns so that the reference elements do not overlap or at least partially overlap.

13. The method according to claim 9, wherein the multi-functional reference signal pattern is constructed via radio resource control signaling, and
wherein the multi-functional reference signal pattern is constructed via at least one of downlink control information or an uplink grant.

14. The method according to claim 9, wherein when the user equipment is handed over to another base station, the user equipment uses the multi-functional reference signal pattern without adding the separate reference signal resource.

15. The method according to claim 9, wherein the functionality comprises at least one of downlink beam management, uplink beam management, channel status information acquisition, demodulation for downlink dedicated data and control, demodulation for downlink common control, uplink channel status information acquisition, or demodulation for uplink dedicated data and control.

16. The method according to claim 9, further comprising:
constructing, at the user equipment, the multi-functional reference signal pattern based on a received default reference signal pattern.

17. An apparatus, comprising:
at least one processor; and
at least one memory including computer program code,
wherein the at least one memory and the computer program code are configured to, with the at least one processor, cause the apparatus at least to:
construct, at a base station, a reference signal comprising a plurality of reference signal patterns, wherein the plurality of reference signal patterns comprise a multi-functional reference signal pattern for at least one of uplink or downlink, wherein the plurality of reference signal patterns comprise at least one of partially overlapping or non-overlapping resource elements, and wherein the plurality of reference signal patterns are constructed dynamically for a specific user or group of users; and send the reference signal from the base station to a user equipment.

18. An apparatus, comprising:

at least one processor; and at least one memory including computer program code, wherein the at least one memory and the computer program code are configured to, with the at least one processor, cause the apparatus at least to:

receive, at a user equipment from a base station, a reference signal comprising a plurality of reference signal patterns, wherein the plurality of reference signal patterns comprise a multi-functional reference signal pattern for at least one of uplink or downlink, wherein the plurality of reference signal patterns comprise at least one of partially overlapping or non-overlapping resource elements, and wherein the plurality of reference signal patterns are constructed dynamically for a specific user or group of users; and determine a functionality of the user equipment based on the reference signal.

19. A computer program product embodied in a non-transitory computer-readable medium, and encoding instructions that, when executed in hardware, perform the process according to claim 1.

20. A computer program product embodied in a non-transitory computer-readable medium and encoding instructions that, when executed in hardware, perform the process according to claim 9.

* * * * *